(12) United States Patent
Kitani

(10) Patent No.: US 11,926,181 B2
(45) Date of Patent: Mar. 12, 2024

(54) HEAVY DUTY PNEUMATIC TIRE

(71) Applicant: SUMITOMO RUBBER INDUSTRIES, LTD., Kobe (JP)

(72) Inventor: Naofumi Kitani, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/983,523

(22) Filed: Nov. 9, 2022

(65) Prior Publication Data
US 2023/0141597 A1    May 11, 2023

(30) Foreign Application Priority Data

Nov. 10, 2021  (JP) ................................. 2021-183309

(51) Int. Cl.
*B60C 9/18*      (2006.01)
*B60C 9/20*      (2006.01)
*B60C 11/03*     (2006.01)

(52) U.S. Cl.
CPC ........ *B60C 9/20* (2013.01); *B60C 2009/1842* (2013.01); *B60C 2009/1857* (2013.01); *B60C 2011/0341* (2013.01)

(58) Field of Classification Search
CPC .......... B60C 2200/06; B60C 2200/065; B60C 9/18; B60C 2009/1871; B60C 2009/1864; B60C 2009/1857; B60C 2009/1842; B60C 2009/1835; B60C 9/20

See application file for complete search history.

(56) References Cited

U.S. PATENT DOCUMENTS 6,367,527 B1 *  4/2002  Cluzel ................... B60C 9/2006
                                                   152/526

FOREIGN PATENT DOCUMENTS

EP    1787825 A1 *  5/2007 ............. B60C 9/185
JP    09-105084 A    4/1997
WO   WO-2015174408 A1 * 11/2015 ............. B60C 11/02

* cited by examiner

*Primary Examiner* — Cedrick S Williams
(74) *Attorney, Agent, or Firm* — Birch, Stewart, Kolasch & Birch, LLP

(57) ABSTRACT

A tire 2 includes a reinforcing layer 20 located between a tread 4 and a carcass 12. The reinforcing layer 20 includes a band 38 and a belt 40. The band 38 includes a full band 42 and a pair of edge bands 44. The full band 42 has an end 42e located axially outward of a shoulder circumferential groove 28s. The belt 40 includes a third belt ply 46C located radially inward of the pair of edge bands 44. A distance Y between each edge band 44 and the full band 42 or the third belt ply 46C is not less than 2.2 mm and not greater than 4.0 mm. A ratio of a tire thickness E at an end PE of a tread surface 22 to a tire thickness D at an equator plane is not less than 1.2 and not greater than 2.0.

16 Claims, 5 Drawing Sheets

HEAVY DUTY PNEUMATIC TIRE

CROSS-REFERENCE TO RELATED APPLICATIONS

This application claims priority on Japanese Patent Application No. 2021-183309 filed on Nov. 10, 2021, the entire content of which is incorporated herein by reference.

TECHNICAL FIELD

The present invention relates to heavy duty pneumatic tires.

BACKGROUND ART

From the viewpoint of drainage performance, the tread of a heavy duty pneumatic tire (hereinafter, tire) has at least three circumferential grooves. Among the circumferential grooves of the tread, the circumferential groove located on each outer side in the axial direction is a shoulder circumferential groove.

A belt and a band are disposed between the tread and a carcass. The belt includes a plurality of belt plies aligned in the radial direction. Each belt ply includes a large number of belt cords aligned with each other. The belt cords are normally steel cords. The band includes a spirally wound band cord. The band cord is a steel cord or a cord formed from an organic fiber such as nylon fiber. The stiffness of a tread portion is controlled by adjusting the configuration of the belt or the band (For example, PATENT LITERATURE 1 below).

CITATION LIST

Patent Literature

PATENT LITERATURE 1: Japanese Laid-Open Patent Publication No. 9-105084

SUMMARY OF THE INVENTION

Technical Problem

A tire in a running state undergoes repeated deformation and restoration. This causes the shape of the tire to change. The ground-contact shape of the tire changes, so that uneven wear resistance of the tire may deteriorate.

In a running state of the tire, a tread end portion of the tire moves actively. The portion of the tread where the circumferential grooves are disposed has a lower stiffness than the portion of the tread where no circumferential groove is disposed. Some low-flatness tires having an aspect ratio of 65% or less have wide tread surfaces. Each shoulder circumferential groove in such a tire is located more outward in the axial direction than that in a high-flatness tire. In the low-flatness tire, a shape change is large around the shoulder circumferential groove. To suppress a shape change, the tire may use a full band including a spirally wound band cord.

The band cord included in the full band substantially extends in the circumferential direction. A force acts on the full band of the tire in a running state so as to spread from the inner side toward the outer side in the radial direction. This force increases the tension of the band cord.

The tire bends when coming into contact with a road surface. This causes the force acting on the full band to decrease, and thus the tension of the band cord decreases. When the tire becomes separated from the road surface and restores, the force acting on the full band increases, and thus the tension of the band cord increases. The band cord of the tire in a running state undergoes repeated fluctuation of the tension. A break may occur in the band cord depending on the degree of fluctuation of the tension. When the band cord breaks, the holding force of the band decreases. In this case, the full band may not be able to contribute to suppression of a shape change.

An edge band is disposed over the end of the full band to suppress the fluctuation of the tension of the band cord in the full band. In this case, the edge band exerts a force on the full band, thus causing an inner portion of the edge band in the radial direction to have strain easily. Depending on the degree of strain, peeling of the cord from the rubber, that is, belt edge loose may occur in an end portion of the belt.

The present invention has been made in view of the above circumstances. An object of the present invention is to provide a heavy duty pneumatic tire that can achieve suppression of a shape change due to running while reducing the risk of occurrence of a break of the band cord and belt edge loose.

Solution to Problem

A heavy duty pneumatic tire according to one aspect of the present invention has a nominal aspect ratio of 65% or less. The heavy duty pneumatic tire includes a tread having a tread surface that comes into contact with a road surface, a pair of sidewalls connected to an end of the tread and located radially inward of the tread, a pair of beads being a first bead and a second bead that are located radially inward of the sidewalls, a carcass located inward of the tread and the pair of sidewalls and extending between the first bead and the second bead, and a reinforcing layer located between the tread and the carcass. The tread has at least three circumferential grooves. Among the at least three circumferential grooves, a circumferential groove located on each outer side in the axial direction is a shoulder circumferential groove. The reinforcing layer includes a band including a spirally wound band cord, and a belt including a large number of belt cords aligned with each other. The band includes a full band and a pair of edge bands located radially outward of an end of the full band. The end of the full band is located axially outward of the shoulder circumferential groove. The belt includes a first belt ply, a second belt ply located radially outward of the first belt ply, and a third belt ply located radially outward of the second belt ply. The third belt ply is located radially inward of the pair of edge bands. A distance between each edge band and the full band or the third belt ply is not less than 2.2 mm and not greater than 4.0 mm. A ratio of a tire thickness at an end of the tread surface to a tire thickness at an equator plane is not less than 1.2 and not greater than 2.0.

Preferably, in the heavy duty pneumatic tire, the edge band has an outer end located axially inward of an end of the third belt ply. A distance in the axial direction from the outer end of the edge band to the end of the third belt ply is not less than 8 mm.

Preferably, in the heavy duty pneumatic tire, the reinforcing layer includes a buffer layer formed from a crosslinked rubber. The buffer layer is located between the pair of edge bands and the full band or the third belt ply.

Preferably, in the heavy duty pneumatic tire, a ratio of a stress of the buffer layer at 200% elongation to a loss tangent of the buffer layer at 70° C. is not less than 75.

Preferably, in the heavy duty pneumatic tire, the buffer layer includes a pair of narrow buffer layers opposed to each other with the equator plane between the narrow buffer layers.

Preferably, in the heavy duty pneumatic tire, the full band is located between the second belt ply and the third belt ply. A direction in which the belt cords included in the second belt ply are inclined is opposite to a direction in which the belt cords included in the third belt ply are inclined.

Advantageous Effects of the Invention

The present invention provides a heavy duty pneumatic tire that can achieve suppression of a shape change due to running while reducing the risk of occurrence of a break of the band cord and belt edge loose.

DETAILED DESCRIPTION

Figure 1:
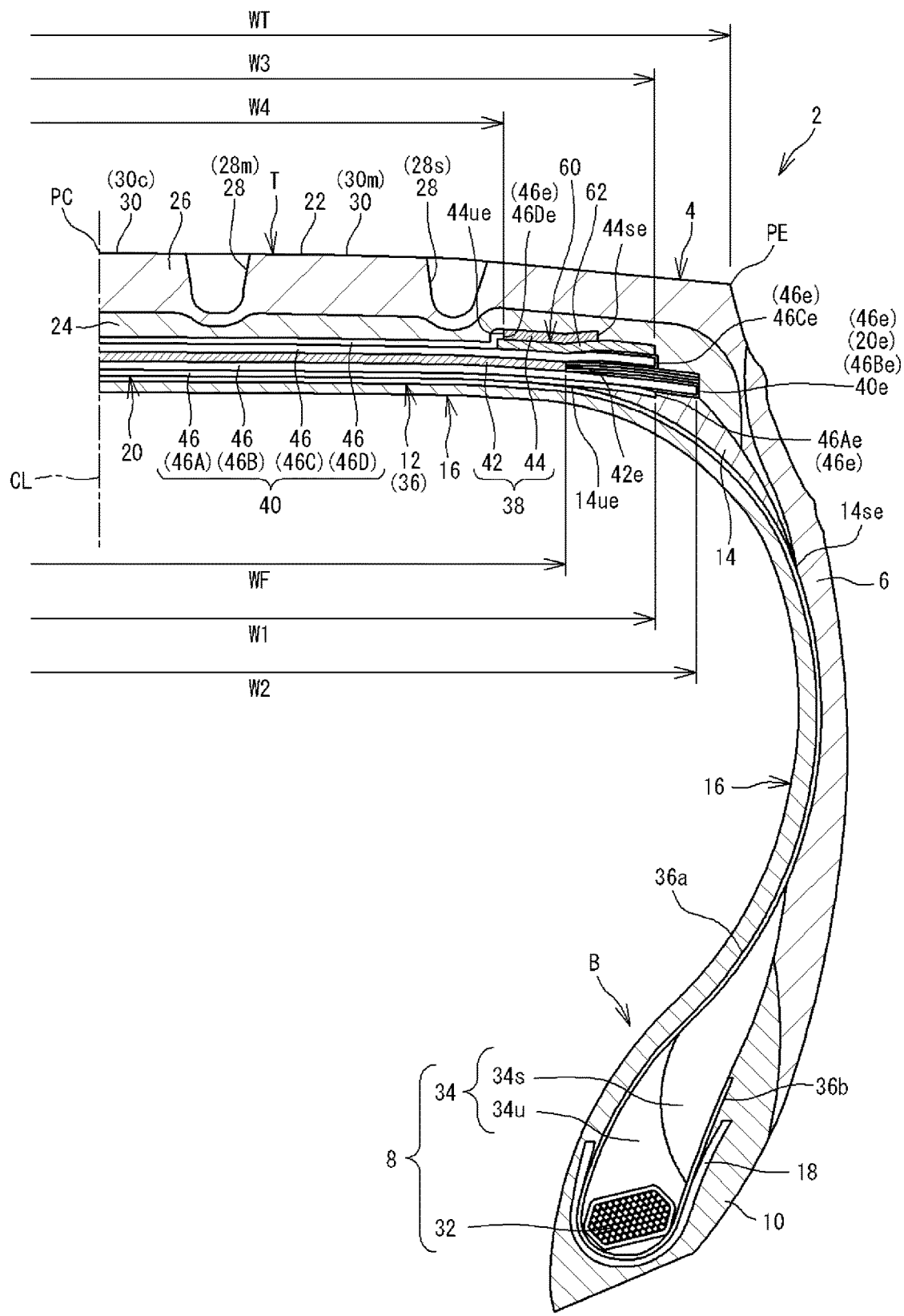
FIG. 1 is a cross-sectional view illustrating a part of a heavy duty pneumatic tire according to an embodiment of the present invention.

The following will describe in detail the present invention based on preferred embodiments with appropriate reference to the drawings.

In the present disclosure, a state where a tire is mounted on a normal rim, the internal pressure of the tire is adjusted to a normal internal pressure, and no load is applied to the tire is referred to as a normal state.

Unless otherwise specified herein, the dimensions and angles of each component of the tire are measured in the normal state.

The dimension and the angle of each component in a meridian cross-section of the tire, which cannot be measured with the tire fitted on the normal rim, are measured in a cross-section of the tire obtained by cutting the tire along a plane including a rotation axis, with the distance between right and left beads being made equal to the distance between the beads in the tire fitted to the normal rim.

The normal rim means a rim specified in a standard on which the tire is based. The "standard rim" in the JATMA standard, the "Design Rim" in the TRA standard, and the "Measuring Rim" in the ETRTO standard are normal rims.

The normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

A normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

In the present disclosure, the "nominal aspect ratio" is the "nominal aspect ratio" included in "tyre designation" specified in JIS D4202 "Automobile tyres-Designation and dimensions".

In the present disclosure, a tread portion of the tire is a portion of the tire that comes into contact with the road surface. A bead portion is a portion of the tire that is fitted to a rim. A side portion is a portion of the tire that extends between the tread portion and the bead portion. The tire includes a tread portion, a pair of bead portions, and a pair of side portions. These portions are portions of the tire.

In the present disclosure, the number of cords included per 5 cm width of a tire element, including cords aligned with each other, is represented as the density of the cords included in this element (unit: ends/5 cm). Unless otherwise specified herein, the density of each cord is obtained in a cross-section of the element obtained by cutting the tire along a plane perpendicular with respect to the longitudinal direction of the cord.

In the present disclosure, a crosslinked rubber is a molded product of a rubber composition obtained by pressurizing and heating the rubber composition. The rubber composition is an uncrosslinked rubber obtained by mixing a base rubber and chemicals in a kneader such as a Banbury mixer. The crosslinked rubber is also referred to as vulcanized rubber, and the rubber composition is also referred to as unvulcanized rubber.

Examples of the base rubber include natural rubber (NR), butadiene rubber (BR), styrene-butadiene rubber (SBR), isoprene rubber (IR), ethylene propylene rubber (EPDM), chloroprene rubber (CR), acrylonitrile-butadiene rubber (NBR), and isobutylene-isoprene-rubber (IIR). Examples of the chemicals include reinforcing agents such as carbon black and silica, plasticizers such as aromatic oils, fillers such as zinc oxide, lubricants such as stearic acid, antioxidants, processing aids, sulfur, and vulcanization accelerators. A base rubber and chemicals are selected as appropriate and the content of each selected chemical is determined as appropriate in accordance with the specification of each element formed from a rubber composition, such as the tread and the sidewalls.

In the present disclosure, the loss tangent (also referred to as tan δ) at a temperature of 70° C., of an element formed from a crosslinked rubber among elements of the tire, is measured in accordance with the regulation of JIS K6394 with a viscoelastic spectrometer ("VES" made by Iwamoto Seisakusho Co., Ltd.) under the following conditions.

Initial strain=10%
Dynamic strain=2%
Frequency=10 Hz
Variation mode=Tensile

In this measurement, a test piece is sampled from the tire. If no test piece can be sampled from the tire, a test piece is sampled from a sheet-shaped crosslinked rubber (hereinafter, also referred to as rubber sheet) obtained by pressurizing and heating, at a temperature of 170° C. for 12 minutes, a rubber composition used to form an element to be measured.

In the present disclosure, the stress at 200% elongation, of an element formed from a crosslinked rubber among elements of the tire, is measured in accordance with the regulation of JIS K6251 (Measurement for determination of tensile stress at a given elongation). Stress at 200% elongation is also referred to as 200% modulus.

FIG. 1 shows a part of a heavy duty pneumatic tire 2 (hereinafter, simply "tire 2") according to an embodiment of the present invention. The tire 2 is mounted to a vehicle such as a truck and a bus. The nominal aspect ratio of the tire 2 is 65% or less. In other words, the tire 2 has a nominal aspect ratio of 65% or less. The tire 2 is a low-flatness tire.

FIG. 1 shows a part of a cross-section (hereinafter, meridian cross-section) of the tire 2 cut along a plane including the rotation axis of the tire 2. In FIG. 1, the right-left direction is the axial direction of the tire 2, the up-down direction is the radial direction of the tire 2. The direction perpendicular to the plane of the drawing sheet of FIG. 1 is a circumferential direction of the tire 2. A dashed and single-dotted line CL represents an equator plane of the tire 2.

The tire 2 includes a tread 4, a pair of sidewalls 6, a pair of beads 8, a pair of chafers 10, a carcass 12, a pair of cushion layers 14, an inner liner 16, a pair of steel fillers 18, and a reinforcing layer 20.

The tread 4 comes into contact with a road surface at an outer surface of the tread 4. The outer surface is a tread surface 22. The tread 4 has the tread surface 22 that comes into contact with the road surface. In FIG. 1, reference sign PC represents the point of intersection of the tread surface 22 and the equator plane. The point of intersection PC is also referred to as an equator of the tire 2.

In FIG. 1, reference character PE represents an end of the tread surface 22. A double-headed arrow WT represents the width of the tread surface 22. The width WT of the tread surface 22 is the distance in the axial direction from a first end PE of the tread surface 22 to a second end PE of the tread surface 22.

In the tire 2, when the ends PE of the tread surface 22 are unidentifiable in appearance, each end PE of the tread surface 22 is defined by a position on the tread surface 22 that corresponds to the outer end in the axial direction of a ground-contact surface obtained when the normal load is applied to the tire 2 in the normal state and the tire 2 is brought into contact with a flat surface at a camber angle of 0°.

The tread 4 includes a base portion 24 and a cap portion 26 located radially outward of the base portion 24. The base portion 24 is formed from a crosslinked rubber having low generation properties. The cap portion 26 is formed from a crosslinked rubber for which wear resistance and grip performance are taken into consideration. As shown in FIG. 1, the base portion 24 covers the entirety of the reinforcing layer 20. The cap portion 26 covers the entirety of the base portion 24.

In the tire 2, the tread 4 has at least three circumferential grooves 28. The tread 4 of the tire 2 shown in FIG. 1 has four circumferential grooves 28. These circumferential grooves 28 are aligned in the axial direction and continuously extend in the circumferential direction.

Among the four circumferential grooves 28 of the tread 4, the circumferential groove 28 located on each outer side in the axial direction is a shoulder circumferential groove 28s. The circumferential groove 28 located inward of the shoulder circumferential groove 28s in the axial direction is a middle circumferential groove 28m. In the tire 2, the four circumferential grooves 28 include a pair of middle circumferential grooves 28m and a pair of shoulder circumferential grooves 28s.

In the tire 2, from the viewpoint of contribution to drainage performance and traction performance, the width in the axial direction of the middle circumferential groove 28m is preferably not less than 2% and not greater than 10% of the width WT of the tread surface 22. The depth of the middle circumferential groove 28m is preferably not less than 13 mm and not greater than 25 mm. The width in the axial direction of the shoulder circumferential groove 28s is preferably not less than 1% and not greater than 7% of the width WT of the tread surface 22. The depth of the shoulder circumferential groove 28s is preferably not less than 13 mm and not greater than 25 mm.

As described above, the tread 4 has at least three circumferential grooves 28. This allows the tread 4 to have at least four land portions 30. The tread 4 of the tire 2 shown in FIG. 1 has four circumferential grooves 28 and thus has five land portions 30. These land portions 30 are aligned in the axial direction and continuously extend in the circumferential direction.

Among the five land portions 30 of the tread 4, the land portion 30 located on each outer side in the axial direction is a shoulder land portion 30s. Each shoulder land portion 30s includes an end PE of the tread surface 22. The land portions 30 located inward of the shoulder land portions 30s in the axial direction are middle land portions 30m. The land portion 30 located inward of the middle land portions 30m in the axial direction is a center land portion 30c. In the tire 2, the five land portions 30 include the center land portion 30c, a pair of middle land portions 30m, and a pair of shoulder land portions 30s.

In the tire 2, the width in the axial direction of the center land portion 30c is not less than 10% and not greater than 18% of the width WT of the tread surface 22. The width in the axial direction of each middle land portion 30m is not less than 10% and not greater than 18% of the width WT of the tread surface 22. The width in the axial direction of each shoulder land portion 30s is not less than 15% and not greater than 25% of the width WT of the tread surface 22. The width in the axial direction of each land portion 30 is represented as the width in the axial direction of the top surface of the land portion 30 that forms a part of the tread surface 22.

In the tire 2, the land portion 30 located at the center in the axial direction among the land portions 30 of the tread 4, that is, the center land portion 30c is located on the equator plane. The tire 2 includes the tread 4 having the land portion 30 on the equator plane. The tread 4 may have the circumferential groove 28 on the equator plane.

Each sidewall 6 is connected to an end of the tread 4. The sidewall 6 extends radially inward from the end of the tread 4. The sidewall 6 is located radially inward of the tread 4. The sidewall 6 is formed from a crosslinked rubber.

Each bead 8 is located radially inward of the sidewall 6. The bead 8 includes a core 32 and an apex 34.

The core 32 extends in the circumferential direction. The core 32 includes a wound steel wire. The core 32 has a substantially hexagonal cross-sectional shape.

The apex 34 is located radially outward of the core 32. The apex 34 includes an inner apex 34u and an outer apex 34s. The inner apex 34u extends radially outward from the core 32. The outer apex 34s is located radially outward of the inner apex 34u. The inner apex 34u is formed from a hard crosslinked rubber. The outer apex 34s is formed from a crosslinked rubber that is more flexible than the inner 34u.

Each chafer 10 is located axially outward of the bead 8. The chafer 10 is located radially inward of the sidewall 6. The chafer 10 comes into contact with a rim (not shown). The chafer 10 is formed from a crosslinked rubber for which wear resistance is taken into consideration The carcass 12 is located inward of the tread 4, the pair of sidewalls 6, and the pair of chafers 10. The carcass 12 extends between a first bead 8 and a second bead 8.

The carcass 12 includes at least one carcass ply 36. The carcass 12 of the tire 2 is composed of one carcass ply 36. The carcass 36 is turned up around each core 32 from the inner side toward the outer side in the axial direction. The carcass ply 36 includes a ply body 36a that extends from a first core 32 to a second core 32, and a pair of turned-up portions 36b that are connected to the ply body 36a and turned up around the respective cores 32 from the inner side toward the outer side in the axial direction.

The carcass ply 36 includes a large number of carcass cords aligned with each other, which are not shown. These carcass cords are covered with a topping rubber. Each carcass cord intersects the equator plane. In the tire 2, an angle (hereinafter, intersection angle of the carcass cord) of the carcass cords relative to the equator plane is not less than 70° and not greater than 90° The carcass 12 has a radial structure. The carcass cords of the tire 2 are steel cords.

Each cushion layer 14 is located between the reinforcing layer 20 and the carcass 12 (specifically, the carcass ply body 36a of the carcass ply 36), at an end 20e of the reinforcing layer 20. The cushion layer 14 has an inner end 14ue located axially inward of the end 20e of the reinforcing layer 20. The cushion layer 14 has an outer end 14se located axially outward of the end 20e of the reinforcing layer 20. The cushion layer 14 is formed from a soft crosslinked rubber.

The inner liner 16 is located inward of the carcass 12. The inner liner 16 is joined to the inner surface of the carcass 12 with an insulation (not shown) between the inner liner 16 and the inner surface. The inner liner 16 constitutes the inner surface of the tire 2. The inner liner 16 is formed from a crosslinked rubber having a high air blocking property. The inner liner 16 retains the internal pressure of the tire 2.

Each steel filler 18 is located at a bead portion B. The steel filler 18 is turned up around the core 32 from the inner side toward the outer side in the axial direction along the carcass ply 36. The steel filler 18 includes a large number of filler cords aligned with each other, which are not shown. The filler cords are steel cords.

The reinforcing layer 20 is located radially inward of the tread 4. The reinforcing layer 20 is located between the tread 4 and the carcass 12. The reinforcing layer 20 includes a band 38 and a belt 40.

The band 38 includes a full band 42 and a pair of edge bands 44.

The full band 42 is disposed such that both ends 42e thereof are opposed to each other across the equator plane. The end 42e of the full band 42 is located axially inward of an end 40e of the belt 40.

In FIG. 1, a double-headed arrow WF represents the width in the axial direction of the full band 42. The width WF in the axial direction of the full band 42 is represented as the distance in the axial direction from a first end 42e of the full band 42 to a second end 42e of the full band 42.

In the tire 2, from the viewpoint of ensuring the stiffness of the tread portion T, a ratio (WF/WT) of the width WF in the axial direction of the full band 42 to the width WT of the tread surface 22 is preferably not less than 0.70 and not greater than 0.80.

The pair of edge bands 44 are spaced apart from each other in the axial direction with the equator plane between the edge bands 44. Each edge band 44 is located between the tread 4 and the full band 42. The edge band 44 is located radially outward of the end 42e of the full band 42. The edge band 44 has an inner end 44ue located axially inward of the end 42e of the full band 42. The edge band 44 has an outer end 44se located axially outward of the end 42e of the full band 42. The edge band 44 overlaps the end 42e of the full band 42 in the radial direction.

In the tire 2, the position of the outer end 44se of the edge band 44 may coincide with the position of the end 42e of the full band 42 in the axial direction. In this case as well, the edge band 44 is located radially outward of the end 42e of the full band 42 and overlaps the end 42e of the full band 42 in the radial direction.

The belt 40 includes at least three belt plies 46 aligned in the radial direction. Each belt ply 46 is disposed such that both ends 46e thereof are opposed to each other across the equator plane.

The belt 40 includes a first belt ply 46A, a second belt ply 46B, a third belt ply 46C, and a fourth belt ply 46D.

The first belt ply 46A is the innermost belt ply 46 in the radial direction among the four belt plies 46 constituting the belt 40. In the tire 2, the first belt ply 46A is layered on the carcass 12, inward of the tread 4.

The second belt ply 46B is located radially outward of the first belt ply 46A. The third belt ply 46C is located radially outward of the second belt ply 46B. The fourth belt ply 46D is located radially outward of the third belt ply 46C. In the tire 2, the fourth belt ply 46D is the outermost belt ply 46 in the radial direction among the four belt plies 46 constituting the belt 40.

In the tire 2, the fourth belt ply 46D is located between the pair of edge bands 44. The third belt ply 46C is located radially inward of the pair of edge bands 44. The pair of edge bands 44 are located radially outward of the first belt ply 46A, the second belt ply 46B, and the third belt ply 46C.

In the tire 2, the second belt ply 46B has the largest width in the axial direction, and the fourth belt ply 46D has the smallest width in the axial direction. The first belt ply 46A and the third belt ply 46C may have the same width in the axial direction. Alternatively, the first belt ply 46A may have a slightly larger width in the axial direction than the third belt ply 46C.

The end 40e of the belt 40 of the tire 2 is represented as the end 46e of the belt ply 46 having the largest width in the axial direction among the plurality of belt plies 46 constituting the belt 40. In the belt 40 of the tire 2, the second belt ply 46B has the largest width in the axial direction as described above. The end 40e of the belt 40 of the tire 2 is represented as an end 46Be of the second belt ply 46B. The end 40e of the belt 40 is also the end 20e of the reinforcing layer 20.

As shown in FIG. 1, the first belt ply 46A has an end 46Ae located axially outward of the shoulder circumferential groove 28s. The second belt ply 46B has an end 46Be also located axially outward of the shoulder circumferential groove 28s. The third belt ply 46C has an end 46Ce also located axially outward of the shoulder circumferential groove 28s. The fourth belt ply 46D has an end 46De also located axially outward of the shoulder circumferential groove 28s. In the tire 2, the end 46De of the fourth belt ply 46D may be located axially inward of the circumferential groove 28s.

As shown in FIG. 1, the end 46Ae of the first belt ply 46A is located axially outward of the end 42e of the full band 42. The end 46Be of the second belt ply 46B is also located axially outward of the end 42e of the full band 42. The end 46Ce of the third belt ply 46C is also located axially outward of the end 42e of the full band 42. In the tire 2, the first belt ply 46A, the second belt ply 46B, and the third belt ply 46C each have a width in the axial direction larger than the width WF in the axial direction of the full band 42.

In FIG. 1, a double-headed arrow W1 represents the width in the axial direction of the first belt ply 46A. A double-headed arrow W2 represents the width in the axial direction of the second belt ply 46B. A double-headed arrow W3 represents the width in the axial direction of the third belt ply 46C. A double-headed arrow W4 represents the width in the axial direction of the fourth belt ply 46D. The width in the axial direction of each belt ply 46 is represented as the width in the axial direction from a first end 46e of the belt ply 46 to a second end 46e of the belt ply 46.

In the tire 2, from the viewpoint of ensuring stiffness of the tread portion T, a ratio (W1/WT) of the width W1 in the axial direction of the first belt ply 46A to the width WT of the tread surface 22 is preferably not less than 0.80 and preferably not greater than 0.90. A ratio (W2/WT) of the width W2 in the axial direction of the second belt ply 46B to the width WT of the tread surface 22 is preferably not less than 0.85 and preferably not greater than 0.95. A ratio (W3/WT) of the width W3 in the axial direction of the third belt ply 46C to the width WT of the tread surface 22 is preferably not less than 0.80 and preferably not greater than 0.90. The width W4 in the axial direction of the fourth belt ply 46D is set as appropriate in accordance with the specifications of the tire 2.

Figure 2:
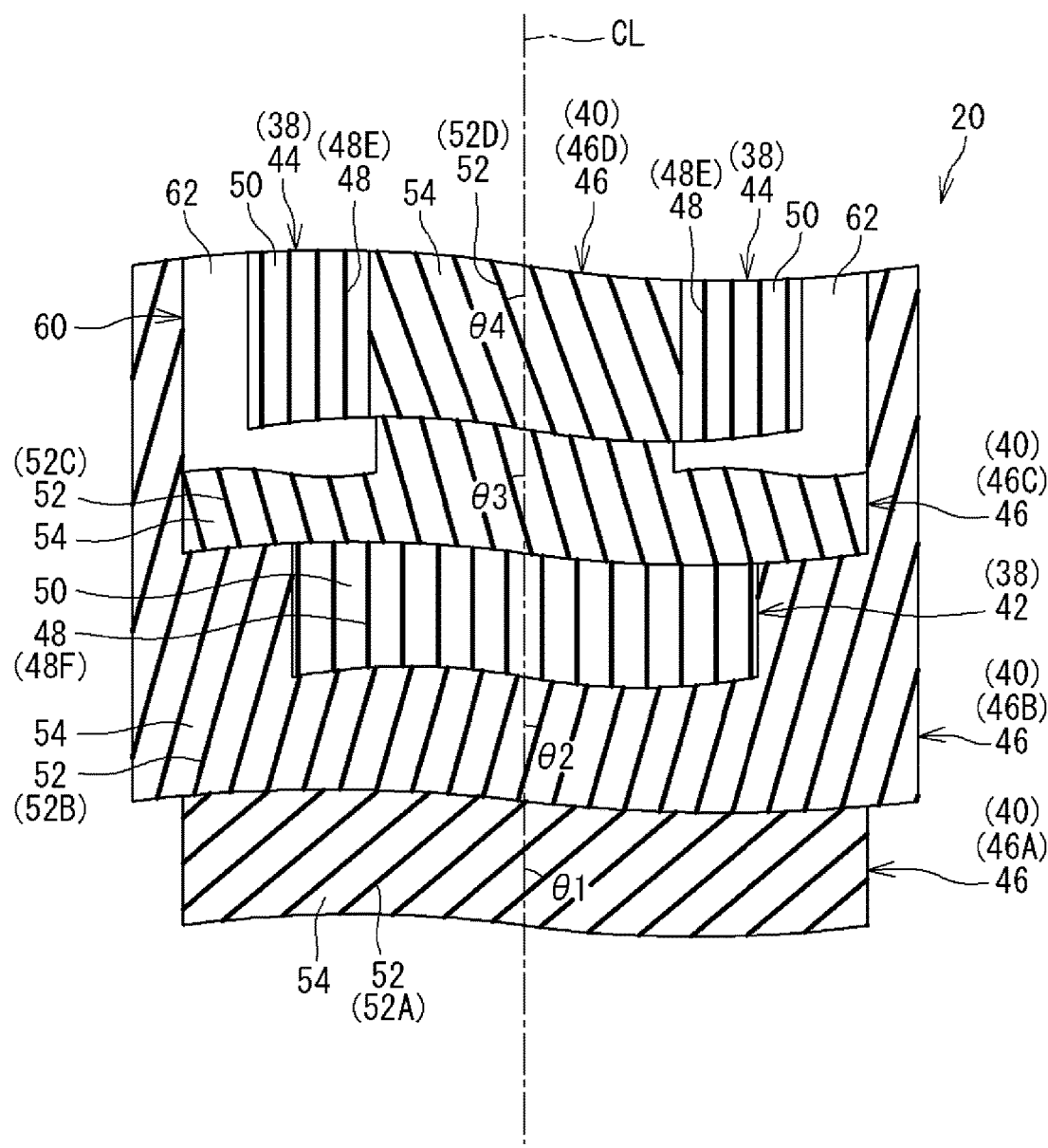
FIG. 2 is a schematic diagram illustrating the configuration of a reinforcing layer according to an embodiment of the present invention.

FIG. 2 shows the configuration of the reinforcing layer 20. In FIG. 2, the right-left direction is the axial direction of the tire 2, and the up-down direction is the circumferential direction of the tire 2. The direction perpendicular to the plane of the drawing sheet of FIG. 2 is the radial direction of the tire 2. The front side of the drawing sheet of FIG. 2 is the outer side in the radial direction, and the back side of the drawing sheet is the inner side in the radial direction.

As shown in FIG. 2, the full band 42 and the edge bands 44 that constitute the band 38 each include a spirally wound band cord 48. In FIG. 2, the band cords 48 are represented by solid lines for the convenience of description, but are covered with a topping rubber 50.

In the tire 2, the band cords 48 are steel cords or cords formed from an organic fiber (hereinafter, organic fiber cords). When the band cords 48 are organic fiber cords, the organic fiber may be, for example, nylon fibers, polyester fibers, rayon fibers, and aramid fibers. In the tire 2, the same cord or different cords may be used as a band cord 48F of the full band 42 and band cords 48E of the edge bands 44. The band cords 48 used for the full band 42 and the edge bands 44 are determined according to the specifications of the tire 2.

As described above, the full band 42 includes the spirally wound band cord 48F. The full band 42 has a jointless structure. In the full band 42, an angle of the band cord 48F relative to the circumferential direction is preferably not greater than 5° and more preferably not greater than 2°. The band cord 48F extends substantially in the circumferential direction.

The density of the band cord 48F in the full band 42 is not less than 20 ends/5 cm and not greater than 35 ends/5 cm. The density of the band cord 48F is represented as the number of cross-sections of the band cord 48F included per 5 cm width of the full band 42 in a cross-section of the full band 42 included in the meridian cross-section.

As described above, the edge band 44 includes the spirally wound band cord 48E. The edge band 44 has a jointless structure. In the edge band 44, an angle of the band cord 48E relative to the circumferential direction is preferably not greater than 5° and more preferably not greater than 2°. The band cord 48E of the edge band 44 extends substantially in the circumferential direction.

The density of the band cord 48E in the edge band 44 is not less than 20 ends/5 cm and not greater than 35 ends/5 cm. The density of the band cord 48E is represented as the number of cross-sections of the band cord 48E included per 5 cm width of the edge band 44 in a cross-section of the edge band 44 along a plane perpendicular to the direction in which the band cord 48E extends.

As shown in FIG. 2, each belt ply 46 constituting the belt 40 includes a large number of belt cords 52 aligned with each other. In FIG. 2, the belt cords 52 are represented by solid lines for the convenience of description, but are covered with a topping rubber 54.

The belt cords 52 of the tire 2 are steel cords. The density of the belt cords 52 in each belt ply 46 is not less than 15 ends/5 cm and not greater than 30 ends/5 cm.

The belt cords 52 in each belt ply 46 are inclined relative to the circumferential direction.

The direction in which the belt cords 52 included in the first belt ply 46A are inclined (hereinafter, the inclination direction of first belt cords 52A) is identical to the direction in which the belt cords 52 included in the second belt ply 46B are inclined (hereinafter, the inclination direction of second belt cords 52B).

The inclination direction of the second belt cords 52B is opposite to the direction in which the belt cords 52 included in the third belt ply 46C are inclined (hereinafter, the inclination direction of third belt cords 52C).

The inclination direction of the third belt cords 52C is identical to the direction in which the belt cords 52 included in the fourth belt ply 46D are inclined (hereinafter, the inclination direction of fourth belt cords 52D).

In the tire 2, the belt 40 is configured such that the second belt cords 52B and the third belt cords 52C cross each other. The belt 40 contributes to stabilization of the ground-contact shape of the tire. The inclination direction of the first belt cords 52A may be opposite to the inclination direction of the second belt cords 52B. The inclination direction of the third belt cords 52C may be opposite to the inclination direction of the fourth belt cords 52D.

In FIG. 2, an angle $\theta 1$ is an angle (hereinafter, inclination angle $\theta 1$ of the first belt cords 52A) of the belt cords 52 included in the first belt ply 46A relative to the equator plane. An angle $\theta 2$ is an angle (hereinafter, inclination angle $\theta 2$ of the second belt cords 52B) of the belt cords 52 included in the second belt ply 46B relative to the equator plane. An angle $\theta 3$ is an angle (hereinafter, inclination angle $\theta 3$ of the third belt cords 52C) of the belt cords 52 included in the third belt ply 46C relative to the equator plane. An angle $\theta 4$ is an angle (hereinafter, inclination angle $\theta 4$ of the fourth belt cords 52D) of the belt cords 52 included in the fourth belt ply 46D relative to the equator plane.

In the tire 2, the inclination angle $\theta 1$ of the first belt cords 52A, the inclination angle $\theta 2$ of the second belt cords 52B, the inclination angle $\theta 3$ of the third belt cords 52C, and the inclination angle $\theta 4$ of the fourth belt cords 52D are preferably not less than 10° and preferably not greater than 60°.

From the viewpoint of effectively restraining movement of the tread portion T and obtaining a ground-contact surface that is stable in shape and whose shape change is small, the inclination angle $\theta 1$ of the first belt cords 52A is preferably not less than 40° and preferably not greater than 60°. The inclination angle $\theta 2$ of the second belt cords 52B is preferably not less than 150 and preferably not greater than 30°. The inclination angle $\theta 2$ of the second belt cords 52B is further preferably not greater than 20°. The inclination angle θ3 of the third belt cords 52C is more preferably not less than 15° and more preferably not greater than 30°. The inclination angle θ3 of the third belt cords 52C is further preferably not greater than 20°. The inclination angle θ4 of the fourth belt cords 52D is more preferably not less than 15° and more preferably not greater than 50°.

Figure 3:
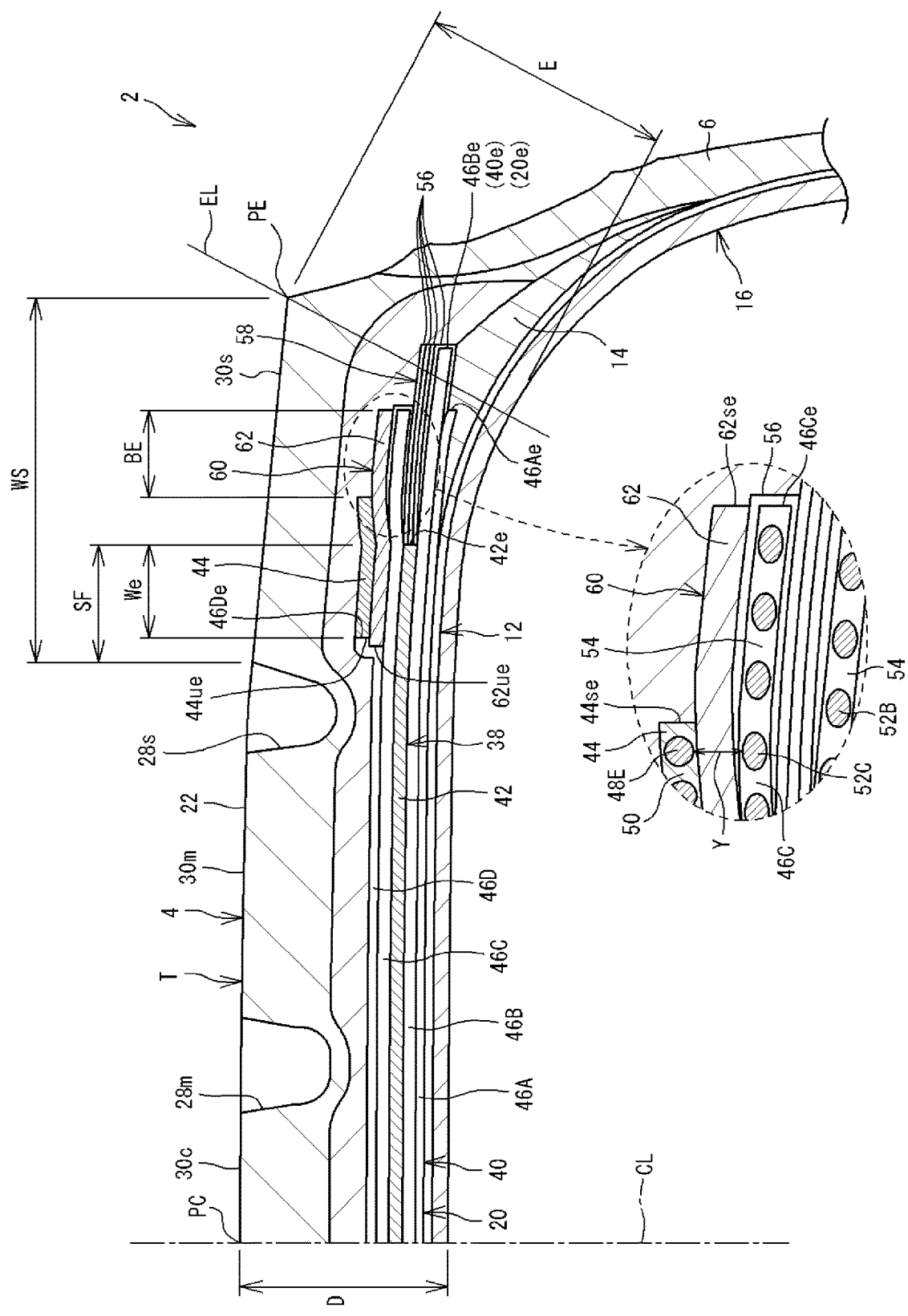
FIG. 3 is an enlarged cross-sectional view illustrating a part of the tire shown in FIG. 1.

FIG. 3 shows a part of the cross-section of the tire 2 shown in FIG. 1. FIG. 3 shows the tread portion T of the tire 2.

In the tire 2, each of the end 46Be of the second belt ply 46B and the end 46Ce of the third belt ply 46C is covered with a rubber layer 56. Two rubber layers 56 are further disposed between the end 46Be of the second belt ply 46B and the end 46Ce of the third belt ply 46C, each of which is covered with the rubber layer 56. In the tire 2, an edge member 58 including four rubber layers 56 is disposed between the end 46Be of the second belt ply 46B and the end 46Ce of the third belt ply 46C. The edge member 58 is formed from a crosslinked rubber. The edge member 58 contributes to maintaining the interval between the end 46Be of the second belt ply 46B and the end 46Ce of the third belt ply 46C. In the tire 2, a change due to running in the positional relationship between the end 46Be of the second belt ply 46B and the end 46Ce of the third belt ply 46C is suppressed. The edge member 58 is a part of the reinforcing layer 20. The reinforcing layer 20 of the tire 2 includes a pair of edge members 58 in addition to the band 38 and the belt 40.

In the tire 2, the full band 42 is disposed such that both ends 42e thereof are opposed to each other across the equator plane, as described above. The full band 42 extends in the axial direction from the equator plane toward each of the ends 42e. Additionally, in the tire 2, the edge band 44 is located outward of the end 42e of the full band 42 in the radial direction.

Although the tire 2 is a low-flatness tire, the full band 42 and the pair of edge bands 44 effectively suppress deformation of the tread portion T. A change of the shape of the tire 2, for example, a change of the contour (hereinafter, also referred to as case line) of the carcass 12, is suppressed, so that a change of the ground-contact shape of the tire 2 is suppressed.

As describe above, the band cord 48F included in the full band 42 extends substantially in the circumferential direction. A force acts on the full band 42 of the tire 2 in a running state so as to spread from the inner side toward the outer side in the radial direction. This force increases the tension of the band cord 48F.

A tire bends when coming into contact with a road surface. This causes the force acting on the full band of the tire to decrease, and thus the tension of the band cord decreases. When the tire becomes separated from the road surface and recovers, the force acting on the full band increases, and thus the tension of the band cord increases. The band cord of the tire in a running state undergoes repeated fluctuation in tension. A break may occur in the band cord depending on the degree of fluctuation of the tension. When the band cord breaks, the holding force of the band decreases. In this case, the full band may not be able to contribute to suppression of a shape change.

In the tire 2, the edge band 44 holds the end 42e of the full band 42. Fluctuation of the tension of the band cord 48F included in the full band 42 is suppressed, so that occurrence of a break of the band cord 48F caused by the fluctuation is suppressed. The full band 42 of the tire 2 can stably exhibit the function of suppressing a shape change. The edge band 44 is narrower than the full band 42. Tension fluctuation as in the full band 42 is thus less likely to occur in the band cord 48E of the edge band 44. A break is thus less likely to occur in the band cord 48E of the edge band 44.

As shown in, for example, FIG. 3, in the tire 2, the full band 42 is disposed between the second belt ply 46B and the third belt ply 46C, which are wider than the full band 42. The second belt ply 46B and the third belt ply 46C reduce the force acting on the full band 42. In particular, the belt cord 52 included in the second belt ply 46B and the belt cord 52 included in the third belt ply 46C have a crossing relationship, thus effectively reducing the force acting on the full band 42. Fluctuation of the tension of the band cord 48 included in the full band 42 is suppressed, so that occurrence of a break of the band cord 48 caused by the fluctuation of the tension is suppressed. The full band 42 of the tire 2 can stably exhibit the function of suppressing a shape change. From this viewpoint, it is preferred that among the first belt ply 46A, the second belt ply 46B, and the third belt ply 46C each included in the belt 40, the second belt ply 46B and the third belt ply 46C are wider than the full band 42 and that the full band 42 is located between the second belt ply 46B and the third belt ply 46C. In this case, the direction in which the belt cords 52 included in the second belt ply 46B are inclined is preferably opposite to the direction in which the belt cords included in the third belt ply 46C are inclined.

In the tire 2, the edge band 44 is disposed outward of the end 42e of the full band 42 to suppress the fluctuation in tension of the band cord 48 of the full band 42 and to prevent a break of the band cord 48. The edge band 44 exerts a force on the full band 42. The inner portion of the edge band 44 in the radial direction is thus in a situation where strain is likely to occur.

As describe above, the full band 42 is located between the second belt ply 46B and the third belt ply 46C. In other words, the third belt ply 46C is located between the edge band 44 and the full band 42. The third belt ply 46C includes the belt cord 52. Thus, when the edge band 44 is close to the third belt ply 46C, strain may concentrate in the radial inner portion of the edge band 44, and belt edge loose caused by the strain may occur. In contrast, when the edge band 44 is distant from the third belt ply 46C, a portion between the edge band 44 and the third belt ply 46C has a huge volume. In this case, belt edge loose caused by heat generation may occur because rubbers tend to generate heat when deformed.

In FIG. 3, a length indicated by a double-headed arrow Y is the distance between the edge band 44 and the third belt ply 46C.

The distance Y is represented as the distance (code-to-code distance) between the band cord 48E included in the edge band 44 at the outer end 44se of the edge band 44 and the third belt cord 52C included in the third belt ply 46C. The distance Y represents the thickness of a rubber element located between the band cord 48E and the third belt cord 52C. When the outer end 44se of the edge band 44 is located axially outward of the end 46Ce of the third belt ply 46C, the distance Y is represented as the distance, at the end 46Ce of the third belt ply 46C, between the band cord 48E and the third belt cord 52C.

In the tire 2, the distance Y between the edge band 44 and the third belt ply 46C is not less than 2.2 mm and not greater than 4.0 mm.

The distance Y is not less than 2.2 mm, thus suppressing occurrence of strain caused by the force exerted by the edge band 44. In the tire 2, occurrence of belt edge loose caused by strain is suppressed. From this viewpoint, the distance Y is preferably not less than 3.0 mm. The distance Y is not greater than 4.0 mm, thus allowing the portion between the edge band 44 and the third belt ply 46C to have an appropriate volume. Heat generation is reduced, so that occurrence of belt edge loose caused by the heat generation is suppressed. From this viewpoint, the distance Y is preferably not greater than 3.5 mm.

In FIG. 3, a solid line EL is a line normal to the outer surface of the carcass 12 and passing through the end PE of the tread surface 22. The line normal to the outer surface of the carcass 12 is hereinafter also referred to as "normal line". The solid line EL is hereinafter also referred to as "normal line EL". A double-headed arrow E represents the thickness of the tire 2 (hereinafter, tire thickness E) measured along the normal line EL of the carcass 12. The normal line EL passes through the portion of the tire 2 where the shoulder land portion 30s are disposed. The tire thickness E is the thickness of the tire 2 at the end PE of the tread surface 22.

In FIG. 3, a double-headed arrow D represents the thickness (hereinafter, tire thickness D) of the tire 2 measured along a line normal to the carcass 12 and passing through the equator PC, that is, along the equator plane. The tire thickness D is the thickness of the tire 2 at the equator plane.

In the tire 2, the thickness measured along the line normal to the carcass 12 is greatest at the normal line EL of the carcass 12 passing through the end PE of the tread surface 22. In the tire 2, the portion where the shoulder land portion 30s is disposed is the thickest portion. An end 20e portion of the reinforcing layer 20 is located at the thickest portion. The thickest portion is a portion that moves actively during running and thus becomes hot easily. If the thickest portion has a large volume, belt edge loose caused by heat generation may occur.

In the tire 2, a ratio (ED) of the tire thickness E at the end PE of the tread surface 22 to the tire thickness D at the equator plane is not less than 1.2 and not greater than 2.0. The ratio (E/D) is not greater than 2.0, thus allowing the portion where the shoulder land portion 30s is disposed to have an appropriate volume. Heat generation is reduced, so that occurrence of belt edge loose caused by this heat generation is suppressed. From this viewpoint, the ratio (E/D) is preferably not greater than 1.8.

The ratio (E/D) is not less than 1.2, thus allowing the tread surface 22 to have an appropriate profile. Occurrence of a bias in the contact pressure distribution is prevented, so that occurrence of uneven wear is suppressed. The effect of the shape-change suppression function of the full band 42 is thus fully achieved. From this viewpoint, the ratio (E/D) is preferably not less than 1.5.

In the tire 2, the end 42e of the full band 42 is located axially outward of the shoulder circumferential groove 28s, the pair of edge bands 44 are located radially outward of the end 42e of the full band 42, the third belt ply 46C is located radially inward of the pair of edge bands 44, the distance Y between the edge band 44 and the third belt ply 46C is not less than 2.2 mm and not greater than 4.0 mm, and the ratio (E/D) of the tire thickness E at the end PE of the tread surface 22 to the tire thickness D at the equator plane is not less than 1.2 and not greater than 2.0.

In the tire 2, occurrence of a break of the band cords 48 and belt edge loose, which may occur when the full band 42 is used to suppress a shape change due to running, is suppressed. The tire 2 achieves suppression of a shape change due to running while reducing the risk of occurrence of a break of the band cords 48 and belt edge loose. The tire 2 has a ground-contact surface that is stable in shape and whose shape change is small, thus improving a variety of performance, such as uneven wear resistance and steering stability.

In the tire 2, the outer end 44se of the edge band 44 is located axially inward of the end 46Ce of the third belt ply 46C. In FIG. 3, a double-headed arrow BE represents the distance in the axial direction from the outer end 44se of the edge band 44 to the end 46Ce of the third belt ply 46C.

In the tire 2, the distance BE in the axial direction is preferably not less than 8 mm. This configuration allows the outer end 44se of the edge band 44 to be disposed at an appropriate distance from the end 46Ce of the third belt ply 46C. This prevents concentration of strain in the end 46Ce of the third belt ply 46C and the outer end 44se of the edge band 44. In the tire 2, the risk of occurrence of belt edge loose is effectively reduced. From this viewpoint, the distance BE in the axial direction is more preferably not less than 10 mm.

In the tire 2, the position of the outer end 44se of the edge band 44 with respect to the end 42e of the full band 42 is determined taking into consideration the holding of the full band 42. Thus, no preferable upper limit of the distance BE in the axial direction is set.

In the tire 2, the distance Y between the edge band 44 and the third belt ply 46C is controlled, as described above. To control the distance Y, the reinforcing layer 20 of the tire 2 includes a buffer layer 60 formed from a crosslinked rubber, between the edge band 44 and the third belt ply 46C.

The buffer layer 60 has a sheet shape and thus contributes to precise control of the distance Y. In the tire 2, the distance Y is an appropriate distance, thus effectively reducing the risk of occurrence of belt edge loose caused by strain as well as the risk of occurrence of belt edge loose caused by heat generation. The buffer layer 60 contributes to reduction of the risk of occurrence of belt edge loose. From this viewpoint, it is preferred that the reinforcing layer 20 includes the buffer layer 60 formed from a crosslinked rubber and that the buffer layer 60 is located between the pair of edge bands 44 and the third belt ply 46C in the radial direction. In the tire 2, the thickness of the buffer layer 60 is set as appropriate taking the distance Y into consideration.

As shown in FIG. 3, the buffer layer 60 of the tire 2 includes a pair of narrow buffer layers 62 disposed with the equator plane between the narrow buffer layers 62. Each of the narrow buffer layers 62 is located immediately below the corresponding edge band 44.

In the tire 2, the position of the outer end 62se of the narrow buffer layer 62 coincides with the position of the outer end 46Ce of the third belt ply 46C in the axial direction. In the axial direction, the position of the outer end 62se of the narrow buffer layer 62 may coincide with the position of the outer end 44se of the edge band 44. The outer end 62se of the narrow buffer layer 62 may be located between the outer end 46Ce of the third belt ply 46C and the outer end 44se of the edge band 44. The position of the outer end 62se of the narrow buffer layer 62 is adjusted as appropriate between the outer end 44se of the edge band 44 and the end 46Ce of the third belt ply 46C, taking into consideration actions of the edge band 44.

Figure 4:
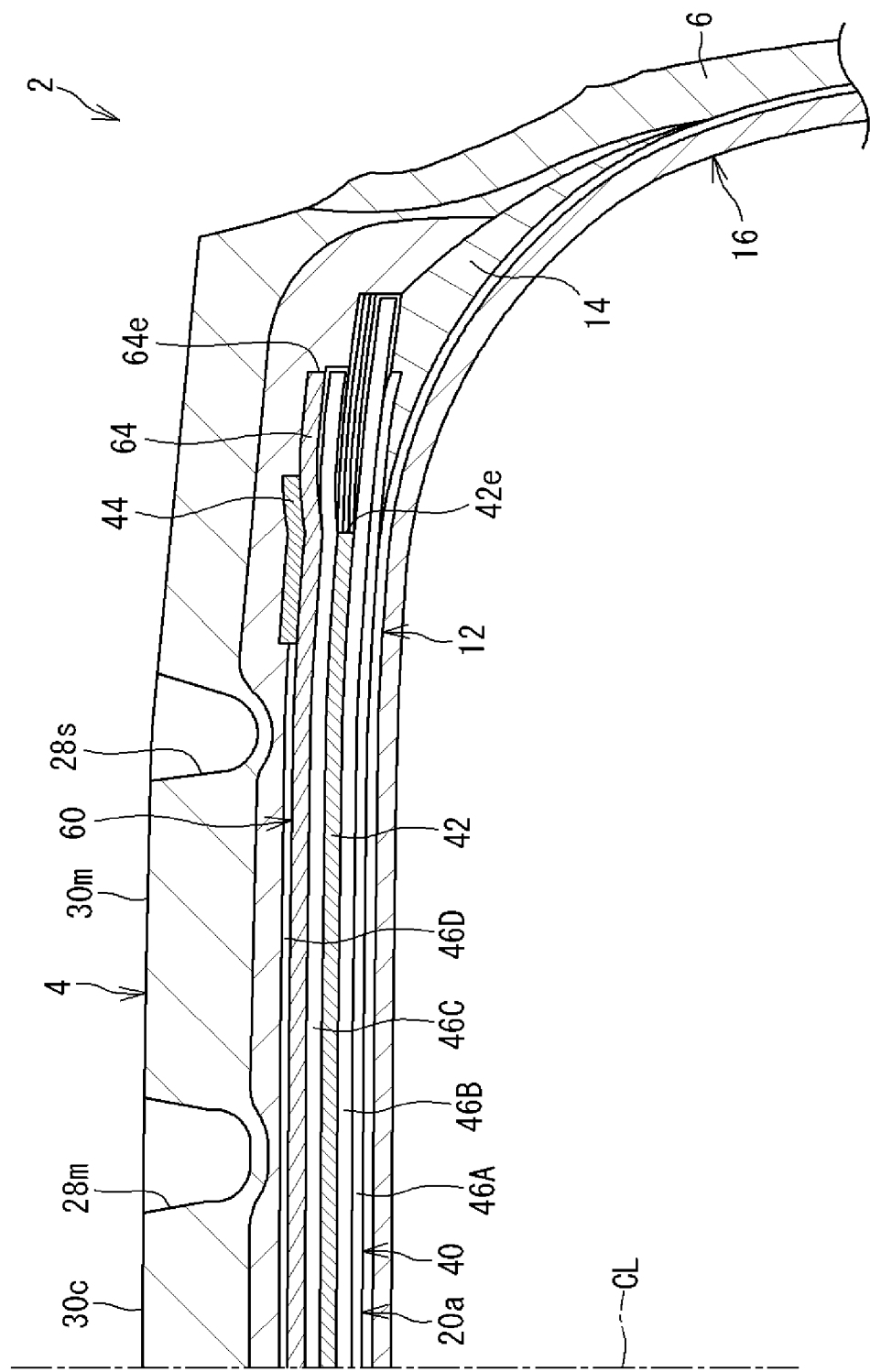
FIG. 4 is an enlarged cross-sectional view of the reinforcing layer, showing a modification of the reinforcing layer.

As shown in FIG. 4, in the tire 2, the buffer layer 60 may include a wide buffer layer 64 having both ends 64e opposed to each other across the equator plane. In this case, the tire 2 has fewer elements than the tire 2 in which the buffer layer 60 includes the pair of narrow buffer layers 62. A reinforcing layer 20a shown in FIG. 4 contributes to improvement of the productivity.

The higher the stress M of the buffer layer 60 at 200% elongation, the less likely the buffer layer 60 has strain. The smaller the loss tangent T of the buffer layer 60 at 70°, the less likely the buffer layer 60 generates heat.

In the tire 2, a ratio (M/T) of the stress M of the buffer layer 60 at 200% elongation to the loss tangent T at 70° C. is preferably not less than 75. This configuration allows the buffer layer 60 to be less likely to have strain and generate heat. The buffer layer 60 effectively contributes to reduction of the risk of occurrence of belt edge loose. From this viewpoint, the ratio (M/T) is more preferably not less than 80 and further preferably not less than 100. From the viewpoint of suppressing occurrence of belt edge loose, the greater the ratio (M/T), the better. Thus, no preferable upper limit of the ratio is set. The ratio (M/T) is calculated with the unit of the stress M at 200% elongation being megapascal (MPa).

In the tire 2, from the viewpoint that the buffer layer 60 having an appropriate stiffness is formed, the stress M of the buffer layer 60 at 200% elongation is preferably not less than 11 MPa. From the viewpoint that the difference in stiffness between the buffer layer 60 and another rubber element located around the buffer layer 60 is appropriately maintained and that occurrence of damage due to the difference in stiffness is suppressed, the stress M at 200% elongation is preferably not greater than 15 MPa.

In the tire 2, the end 42e of the full band 42 is located outward of the shoulder circumferential groove 28s in the axial direction, as described above.

In FIG. 3, a double-headed arrow SF represents the direction in the axial direction from the shoulder circumferential groove 28s, specifically from the outer edge of the shoulder circumferential groove 28s to the end 42e of the full band 42. A double-headed arrow WS represents the width in the axial direction of the shoulder land portion 30s. The width WS in the axial direction is represented as the distance in the axial direction from the inner end of the top surface of the shoulder land portion 30s (i.e., the outer edge of the shoulder circumferential groove 28s) to the outer end of this top surface (in the tire 2, the end PE of the tread surface 22).

In the tire 2, a ratio (SF/WS) of the distance SF in the axial direction from the shoulder circumferential groove 28s to the end 42e of the full band 42 to the width WS in the axial direction of the shoulder land portion 30s is preferably not greater than 50%. This configuration allows the end 42e of the full band 42 to be disposed distant from an end portion of the tread 4 that actively moves in a running state. Fluctuation of the tension of the band cord 48 is suppressed, so that occurrence of a break of the band cord 48 is suppressed in the tire 2. The full band 42 of the tire 2 contributes to suppression of a shape change. From this viewpoint, the ratio (SF/WS) is more preferably not greater than 35% and further preferably not greater than 25%.

When the ratio (SF/WS) is set to be not less than 10%, the end 42e of the full band 42 is located at an appropriate distance from the shoulder circumferential groove 28s, specifically from the bottom of the shoulder circumferential groove 28s. In the tire 2, occurrence of damage starting from the bottom of the shoulder circumferential groove 28s is suppressed. The width of the full band 42 is ensured, thus allowing the full band 42 to contribute to suppression of a shape change of the tire 2. From this viewpoint, the ratio (SF/WS) is more preferably not less than 15%.

In the tire 2, the inner end 44ue of the edge band 44 is located inward of the end 42e of the full band 42 in the axial direction, as described above. In FIG. 3, a length indicated by reference sign We is the distance in the axial direction from the end 42e of the full band 42 to the inner end 44ue of the edge band 44.

In the tire 2, the distance We in the axial direction from the end 42e of the full band 42 to the inner end 44ue of the edge band 44 is preferably not less than 10 mm. This configuration allows the edge band 44 to effectively hold the end 42e of the full band 42. Fluctuation of the tension of the band cord 48 included in the full band 42 is suppressed, so that occurrence of a break of the band cord 48 due to the fluctuation of the tension is suppressed. The full band 42 of the tire 2 can more stably exhibit the function of suppressing a shape change. From this viewpoint, the distance We in the axial direction is preferably not less than 20 mm. From the viewpoint that the influence of the edge band 44 on the mass of the tire 2 is reduced, the distance We in the axial direction is preferably not greater than 50 mm.

In the tire 2, the position of the inner end 44ue of the edge band 44 is determined in consideration of involvement in occurrence of damage starting from the bottom of the shoulder circumferential groove 28s. From the viewpoint of effectively suppressing occurrence of damage starting from the bottom of the shoulder circumferential groove 28s, in the axial direction, the inner end 44ue of the edge band 44 is preferably located outward of the bottom of the shoulder circumferential groove 28s and is more preferably located further outward of the shoulder circumferential groove 28s. In the tire 2, the inner end 44ue of the edge band 44 may be located inward of the bottom of the shoulder circumferential groove 28s in the axial direction. In this case, the inner end 44ue of the edge band 44 is more preferably located further inward of the shoulder circumferential groove 28s in the axial direction.

Figure 5:
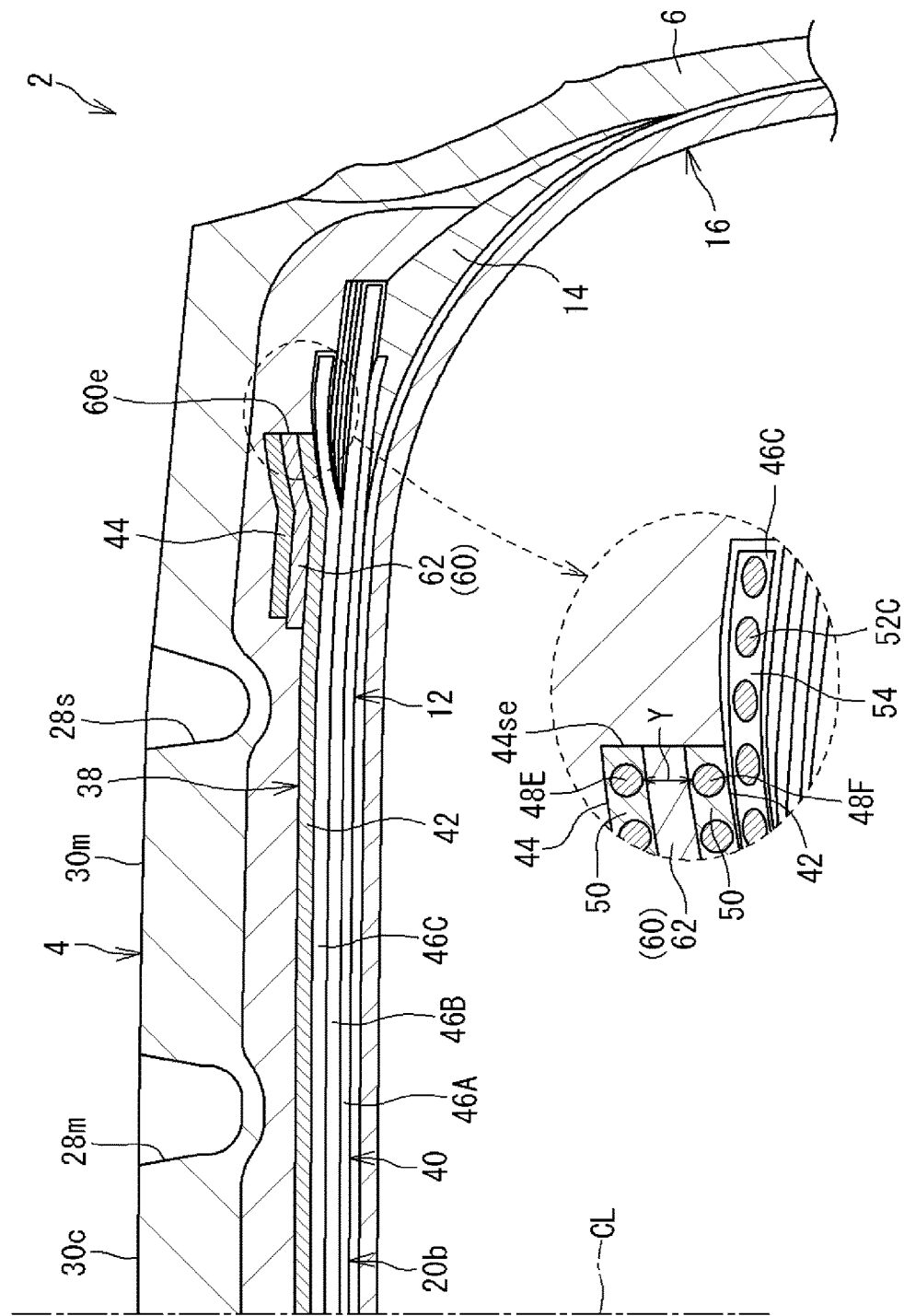
FIG. 5 is an enlarged cross-sectional view of the reinforcing layer, showing another modification of the reinforcing layer.

FIG. 5 shows a modification of the reinforcing layer 20. A reinforcing layer 20b has substantially the same configuration as the reinforcing layer 20 shown in FIG. 3, except for the exclusion of the fourth belt ply 46D and the change of the position of the full band 42. The same elements as those of the reinforcing layer 20 shown in FIG. 3 are designated by the same reference signs, and the description thereof is omitted.

In the reinforcing layer 20b, the entirety of the band 38 is located radially outward of the belt 40. In the reinforcing layer 20b, the full band 42 is disposed radially outward of the third belt ply 46C, whereas in the reinforcing layer 20 shown in FIG. 3, the full band 42 is disposed between the third belt ply 46C and the second belt ply 46B. The pair of narrow buffer layers 62 constituting the buffer layer 60 are located between the pair of edge bands 44 and the full band 42.

In the reinforcing layer 20b as well, the buffer layer 60 contributes to control of the distance Y. In the reinforcing layer 20b, the distance Y is the distance between the edge band 44 and the full band 42. As shown in FIG. 5, the distance Y in the reinforcing layer 20b is represented as the distance between the band cord 48E included in the edge band 44 at the outer end 44se of the edge band 44 and the band cord 48F included in the full band 42. When the edge band 44 is configured such that the full band 42 is turned up at the end 60e of the buffer layer 60, the distance Y is represented as the distance between the band cord 48E included in the edge band 44 and the band cord 48F included in the full band 42, which is obtained at an end of a portion of the buffer layer 60 that has a uniform thickness. When the outer end 44se of the edge band 44 is located axially outward of the end 42e of the full band 42, the distance Y is represented as the distance, at the end 42e of the full band 42, between the band cord 48E and the band cord 48F.

In the reinforcing layer 20b as well, the distance Y is preferably not less than 2.2 mm and not greater than 4.0 mm, preferably not less than 3.0 mm, and preferably not greater than 3.5 mm. This configuration allows the distance Y to be an appropriate distance. The risk of occurrence of belt edge loose caused by strain as well as the risk of occurrence of belt edge loose caused by heat generation is thus effectively reduced in the tire 2.

As is obvious from the above description, the present invention provides the heavy duty pneumatic tire 2 that can achieve suppression of a shape change due to running while reducing the risk of occurrence of a break of the band cord and belt edge loose. The present invention exhibits a noticeable effect in the low-flatness heavy duty tire 2 having a nominal aspect ratio of 65% or less.

EXAMPLES

The following will further describe the present invention by way of, for example, Examples, but the scope of the present invention should not be limited to these Examples.

Example 1

A heavy duty pneumatic tire (tire size=355/50R22.5) having the basic structure shown in FIGS. 1 to 3 and having the specifications shown in Table 1 below was obtained.

The band in Example 1 includes a full band and a pair of edge bands.

The full band is disposed between the second belt ply and the third belt ply.

The end of the full band is located axially outward of the shoulder circumferential groove. This is represented as "Y" in the cell for "FB" in Table 1.

The pair of edge bands are disposed radially outward of the end of the full band. The end of the full band is covered by the edge band. This is represented as "Y" in the cell for "EB" in Table 1.

The distance Y between the edge band and the third belt ply, the distance BE in the axial direction from the outer end of the edge band to the end of the third belt ply, the ratio (E/D) of the tire thickness E at the end of the tread surface to the tire thickness D at the equator plane, and the ratio (M/T) of the stress M of the buffer layer at 200% elongation to the loss tangent T at 70° C. were set as shown in Table 1 below. The buffer layer in Example 1 includes a pair of narrow buffer layers.

Examples 2 to 7 and Comparative Examples 1 to 4

Tires of Examples 2 to 7 and Comparative Examples 1 to 4 were obtained in the same manner as Example 1, except that the distance Y, the distance BE, the ratio (E/D), and the ratio (M/T) were set as shown in Tables 1 and 2 below.

In Comparative Example 1, the end of the full band is located axially inward of the shoulder circumferential groove. This is represented as "N" in the cell for "FB" in Table 1.

In Comparative Example 2, the outer end of the edge band is located axially inward of the end of the full band. The edge band is not disposed radially outward of the end of this full band. This is represented as "N" in the cell for "EB" in Table 1.

[Profile Change]

A test tire was fitted onto a rim (11.75×22.5) and inflated with air to adjust the internal pressure of the tire to a normal internal pressure. The tire was caused to run on a drum tester at a speed of 80 km/h for 1000 km, and a profile of the case line on the inner side of the shoulder circumferential groove was obtained. The profile of the case line was compared with the profile of the case line before running to confirm a change in profile before and after running. The results are represented as indexes according to the following ratings in Tables 1 and 2 below. A higher value represents that a change in profile is suppressed. In the running test, a normal load was applied to the tire. In this evaluation, not less than 95 is allowable.

| Change amount | Index |
|---|---|
| 0.0 mm to 0.5 mm | 100 |
| 0.6 mm to 1.0 mm | 95 |
| 1.1 mm to 1.5 mm | 90 |
| 1.6 mm to 2.0 mm | 85 |
| 2.1 mm to 2.5 mm | 80 |

[Uneven Wear Resistance]

A test tire was fitted onto a rim (11.75×22.5) and inflated with air to adjust the internal pressure of the tire to a normal internal pressure. The tire was mounted to the drive shaft of a test vehicle (tractor head). The test vehicle was caused to tow a trailer loaded with luggage and to run on a test course including an asphalt road surface. The difference in amount of wear between the shoulder land portion and the middle land portion of the test tire was calculated when the wear ratio of the tire reached 30% in terms of mass. The result is represented as an index with the result of Example 1 being regarded as 100, in Tables 1 and 2 below. A higher value represents that the difference in amount of wear is smaller and the uneven wear resistance is higher. In this evaluation, not less than 95 is allowable.

[JLB Break Resistance]

Each tire for which the above-described evaluation had been made for uneven wear resistance was inspected by sialography or X-ray to confirm the presence or absence of internal damage. When internal damage was confirmed, the tire was disassembled to confirm whether this internal damage was a break of the band cord of the full band. The results are shown in Tables 1 and 2 below according to the following ratings. In this evaluation, the rating D is unallowable, and the other ratings are allowable.

| | |
|---|---|
| Case where no broken portion is observed in the band cord | A |
| Case where one broken portion is observed in the band cord | B |
| Case where two broken portions are observed in the band cord | C |
| Case where three or more broken portions are observed in the band cord | D |

[BEL Resistance]

The test tire was fitted onto a rim (11.75×22.5) and inflated with air to adjust the internal pressure of the tire to a normal internal pressure. The tire was caused to run on a drum tester at a speed of 100 km/h with a load 1.4 times the normal load being applied to the tire, and the time to occurrence of belt edge loose (BEL) was measured. The result is represented as an index with the result of Example 1 being regarded as 100, in Tables 1 and 2 below. In this evaluation, not less than 80 is allowable.

TABLE 1

|  | Comparative Example 1 | Comparative Example 2 | Comparative Example 3 | Comparative Example 4 | Example 1 | Example 2 |
|---|---|---|---|---|---|---|
| FB | N | Y | Y | Y | Y | Y |
| EB | Y | N | Y | Y | Y | Y |
| Y [mm] | 3.0 | 3.0 | 1.5 | 2.2 | 3.2 | 2.2 |
| BE [mm] | 8 | — | 8 | 10 | 15 | 5 |
| E/D [—] | 1.2 | 1.2 | 1.2 | 0.5 | 1.7 | 2.0 |
| M/T | 80 | 80 | 100 | 100 | 160 | 100 |
| Profile change | 85 | 100 | 100 | 90 | 100 | 95 |
| Uneven wear resistance | 85 | 95 | 90 | 80 | 100 | 95 |
| JLB break resistance | B | C | B | B | A | B |
| BEL resistance | 70 | 70 | 70 | 80 | 100 | 80 |

TABLE 2

|  | Example 3 | Example 4 | Example 5 | Example 6 | Example 7 |
|---|---|---|---|---|---|
| FB | Y | Y | Y | Y | Y |
| EB | Y | Y | Y | Y | Y |
| Y [mm] | 2.2 | 2.2 | 2.2 | 4.0 | 3.2 |
| BE [mm] | 10 | 10 | 10 | 8 | 8 |
| E/D [−] | 2.0 | 2.0 | 1.2 | 2.0 | 1.5 |
| M/T | 50 | 80 | 80 | 100 | 100 |
| Profile change | 95 | 95 | 95 | 95 | 100 |
| Uneven wear resistance | 95 | 95 | 95 | 95 | 100 |
| JLB break resistance | B | B | B | A | A |
| BEL resistance | 80 | 90 | 90 | 90 | 90 |

In Examples, suppression of a shape change due to running is achieved while the risk of occurrence of a break of the band cord and belt edge loose is reduced, as shown in Tables 1 and 2. From the evaluation results, the advantages of the present invention are clear.

INDUSTRIAL APPLICABILITY

The above-described technology for achieving suppression of a shape change due to running while reducing the risk of occurrence of a break of the band cord and belt edge loose can be applied to various tires.

REFERENCE SIGNS LIST 2 tire
4 tread
6 sidewall
8 bead
12 carcass
20 reinforcing layer
22 tread surface
28s shoulder circumferential groove
38 band
40 belt
42 full band
44 edge band
46, 46A, 46B, 46C, 46D belt ply
48 band cord
52 belt cord
60 buffer layer
62 narrow buffer layer
64 wide buffer layer

The invention claimed is:

1. A heavy duty pneumatic tire having a nominal aspect ratio of 65% or less, the heavy duty pneumatic tire comprising:
    a tread having a tread surface that comes into contact with a road surface;
    a pair of sidewalls connected to an end of the tread and located radially inward of the tread;
    a pair of beads being a first bead and a second bead that are located radially inward of the pair of sidewalls;
    a carcass located inward of the tread and the pair of sidewalls and extending between the first bead and the second bead; and
    a reinforcing layer located between the tread and the carcass,
wherein
    the tread has at least three circumferential grooves,
    among the at least three circumferential grooves, is a shoulder circumferential groove which is a circumferential groove located on each outer side in an axial direction,
    the reinforcing layer includes a band including a spirally wound band cord, and a belt including a large number of belt cords aligned with each other,
    the band includes a full band and a pair of edge bands located radially outward of an end of the full band,
    the end of the full band is located axially outward of the shoulder circumferential groove,
    the belt includes at least three belt plies aligned in the radial direction,
    the at least three belt plies include a first belt ply, a second belt ply located radially outward of the first belt ply, and a third belt ply located radially outward of the second belt ply,
    the third belt ply is located radially inward of the pair of edge bands,
    a distance between each edge band and the full band or the third belt ply is not less than 2.2 mm and not greater than 4.0 mm,
    a ratio of a tire thickness at an end of the tread surface to a tire thickness at an equator plane is not less than 1.2 and not greater than 2.0, and
    the reinforcing layer further includes a buffer layer consisting of a crosslinked rubber which is located between the pair of edge bands and the full band or the third belt ply.

2. The heavy duty pneumatic tire according to claim 1, wherein the edge band has an outer end located axially inward of an end of the third belt ply, and a distance in the axial direction from the outer end of the edge band to the end of the third belt ply is not less than 8 mm.

3. The heavy duty pneumatic tire according to claim 1, wherein a ratio of a stress of the buffer layer at 200% elongation to a loss tangent of the buffer layer at 70° C. is not less than 75.

4. The heavy duty pneumatic tire according to claim 1, wherein the buffer layer includes a pair of narrow buffer layers opposed to each other with the equator plane between the narrow buffer layers.

5. The heavy duty pneumatic tire according to claim 1, wherein the buffer layer includes a wide buffer layer having both ends opposed to each other across the equator plane.

6. The heavy duty pneumatic tire according to claim 1, wherein the first belt ply, the second belt ply, and the third belt ply each have a width in the axial direction larger than a width in the axial direction of the full band.

7. The heavy duty pneumatic tire according to claim 1, wherein among the belt plies constituting the belt, the second belt ply has a largest width in the axial direction.

8. The heavy duty pneumatic tire according to claim 1, wherein
 the reinforcing layer includes a pair of edge members consisting of a crosslinked rubber, and
 each edge member is located between an end of the second belt ply and an end of the third belt ply.

9. The heavy duty pneumatic tire according to claim 1, wherein
 the full band is located between the second belt ply and the third belt ply, and
 a direction in which the belt cords included in the second belt ply are inclined is opposite to a direction in which the belt cords included in the third belt ply are inclined.

10. The heavy duty pneumatic tire according to claim 9, wherein the distance between each edge band and the third belt ply is not less than 2.2 mm and not greater than 4.0 mm.

11. The heavy duty pneumatic tire according to claim 10, wherein the distance represents a thickness of a rubber element located between the band cord included in the edge band and the belt cord included in the third belt ply.

12. The heavy duty pneumatic tire according to claim 11, wherein
 the reinforcing layer includes a buffer layer consisting of a crosslinked rubber, and
 the buffer layer is located between the pair of edge bands and the third belt ply.

13. The heavy duty pneumatic tire according to claim 1, wherein the band is located radially outward of the belt.

14. The heavy duty pneumatic tire according to claim 13, wherein the distance between each edge band and the full band is not less than 2.2 mm and not greater than 4.0 mm.

15. The heavy duty pneumatic tire according to claim 14, wherein the distance represents a thickness of a rubber element located between the band cord included in the edge band and the band cord included in the full band.

16. The heavy duty pneumatic tire according to claim 15, wherein the buffer layer is located between each edge band and the full band.

* * * * *